(12) United States Patent
Liu et al.

(10) Patent No.: US 10,826,251 B2
(45) Date of Patent: Nov. 3, 2020

(54) CONNECTOR AND LIGHT PIPE ASSEMBLY

(71) Applicant: Tyco Electronics (Shanghai) Co. Ltd., Shanghai (CN)

(72) Inventors: WenYu Liu, Shanghai (CN); Hongqiang Han, Shanghai (CN); Chenxi Wang, Shanghai (CN); Jiwang Jin, Shanghai (CN); Xingjie Ge, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 16/360,110

(22) Filed: Mar. 21, 2019

(65) Prior Publication Data
US 2019/0296502 A1  Sep. 26, 2019

(30) Foreign Application Priority Data

Mar. 26, 2018  (CN) .......................... 2018 1 0252007

(51) Int. Cl.
| | | |
|---|---|---|
| *H01R 3/00* | (2006.01) | |
| *H01R 13/717* | (2006.01) | |
| *H01R 12/58* | (2011.01) | |
| *H01R 13/6582* | (2011.01) | |
| *F21V 8/00* | (2006.01) | |

(52) U.S. Cl.
CPC ....... *H01R 13/7172* (2013.01); *G02B 6/0006* (2013.01); *H01R 12/58* (2013.01); *H01R 13/6582* (2013.01)

(58) Field of Classification Search
CPC ................................................ H01R 13/7172
USPC ......................................................... 439/490
See application file for complete search history.

(56) References Cited

U.S. PATENT DOCUMENTS

| | | | | |
|---|---|---|---|---|
| 4,580,861 | A * | 4/1986 | Kaley .................. | H01R 13/514 439/594 |
| 6,264,499 | B1 * | 7/2001 | Costello ............. | H01R 13/6641 385/92 |
| 6,375,517 | B1 * | 4/2002 | Okabe .................. | H01R 13/514 439/594 |
| 7,249,966 | B2 * | 7/2007 | Long ................ | H01R 13/65802 439/490 |
| 7,390,212 | B1 * | 6/2008 | Yang .................... | H01R 13/717 439/490 |
| 7,621,773 | B2 * | 11/2009 | Bright .................. | G02B 6/4246 439/490 |
| 8,684,765 | B2 * | 4/2014 | Shirk .................. | G02B 6/0008 362/551 |
| 8,823,540 | B2 * | 9/2014 | Scholeno ............. | H01R 12/716 340/815.4 |
| 9,255,703 | B2 * | 2/2016 | Auyeung ............... | F21V 29/502 |
| 9,281,636 | B1 * | 3/2016 | Schmitt ............. | H01R 13/7175 |
| 9,739,959 | B2 * | 8/2017 | Masahiko ................ | G02B 6/32 |

(Continued)

FOREIGN PATENT DOCUMENTS

| | | |
|---|---|---|
| CN | 1316805 A | 10/2001 |
| CN | 105093391 A | 11/2015 |

*Primary Examiner* — Neil Abrams
(74) *Attorney, Agent, or Firm* — Barley Snyder

(57) ABSTRACT

A connector having a cage with a top wall, a bottom wall and a pair of side walls between the top wall and the bottom wall and a light pipe assembly with a light pipe and a connection structure fixing the light pipe assembly on an outer surface of one of the cage side walls.

20 Claims, 5 Drawing Sheets

(56) References Cited

U.S. PATENT DOCUMENTS

| | | | |
|---|---|---|---|
| 2001/0039140 A1* | 11/2001 | Fasold | H01R 13/6641 |
| | | | 439/490 |
| 2010/0111476 A1 | 5/2010 | Shirk et al. | |
| 2019/0296493 A1* | 9/2019 | Liu | G02B 6/0001 |
| 2019/0296502 A1* | 9/2019 | Liu | H01R 12/58 |

* cited by examiner

CONNECTOR AND LIGHT PIPE ASSEMBLY

CROSS-REFERENCE TO RELATED APPLICATION

This application claims the benefit of the filing date under 35 U.S.C. § 119(a)-(d) of Chinese Patent Application No. 201810252007.0 filed on Mar. 26, 2018.

FIELD OF THE INVENTION

The present invention relates, in general, to connectors and, more particularly, to a connector that dissipates heat generated by the connector.

BACKGROUND

In the related art, a connector generally comprises a metal cage (for example, a steel cage) and a contact module provided in the metal cage. The contact module generally includes a contact adapted to electrically contact a mating connector inserted into the connector. In the related art, due to increasing transmission speeds of the connector, heat generated by the connector also increases in a similar fashion. As a result, it is necessary to install a radiator on the top wall of the connector metal cage to increase the heat dissipation and improve the performance of the connector.

Generally, in order to facilitate a users' observation of the working state of the connector, light pipes may be used which transmit light from an indicator on a circuit board to the front side of the connector. In this way, the user may determine the working state of the connector based upon the indicator light.

Due to the limited space of the connector, light pipes are usually provided in a gap between the radiator fins, impacting the ventilation performance of the radiator and greatly reducing the heat dissipation of the connector.

SUMMARY

A connector, constructed in accordance with the present invention, generally comprises a cage having a top wall, a bottom wall and a pair of side walls between the top wall and the bottom wall and a light pipe assembly having a light pipe and a first connection structure. The first connection structure is configured to fix the light pipe assembly on an outer surface of one of the side walls of the cage.

According to another general concept of the present disclosure, a connector generally comprises a cage having a top wall, a bottom wall and a pair of side walls between the top wall and the bottom wall. Further, a connector generally has an insertion connection and a connection structure fixed to an outer surface of the side wall of the cage. Additionally, a light pipe assembly including a light pipe is fixed to the connection structure by the insertion connection in a vertical direction perpendicular to the bottom wall of the cage.

In the above various exemplary embodiments of the present disclosure, the light pipe is mounted on the side wall of the cage, instead of being mounted in a gap between fins of the radiator. Thereby, the ventilation performance of the radiator will not be affected, and the heat dissipation performance of the connector is improved.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
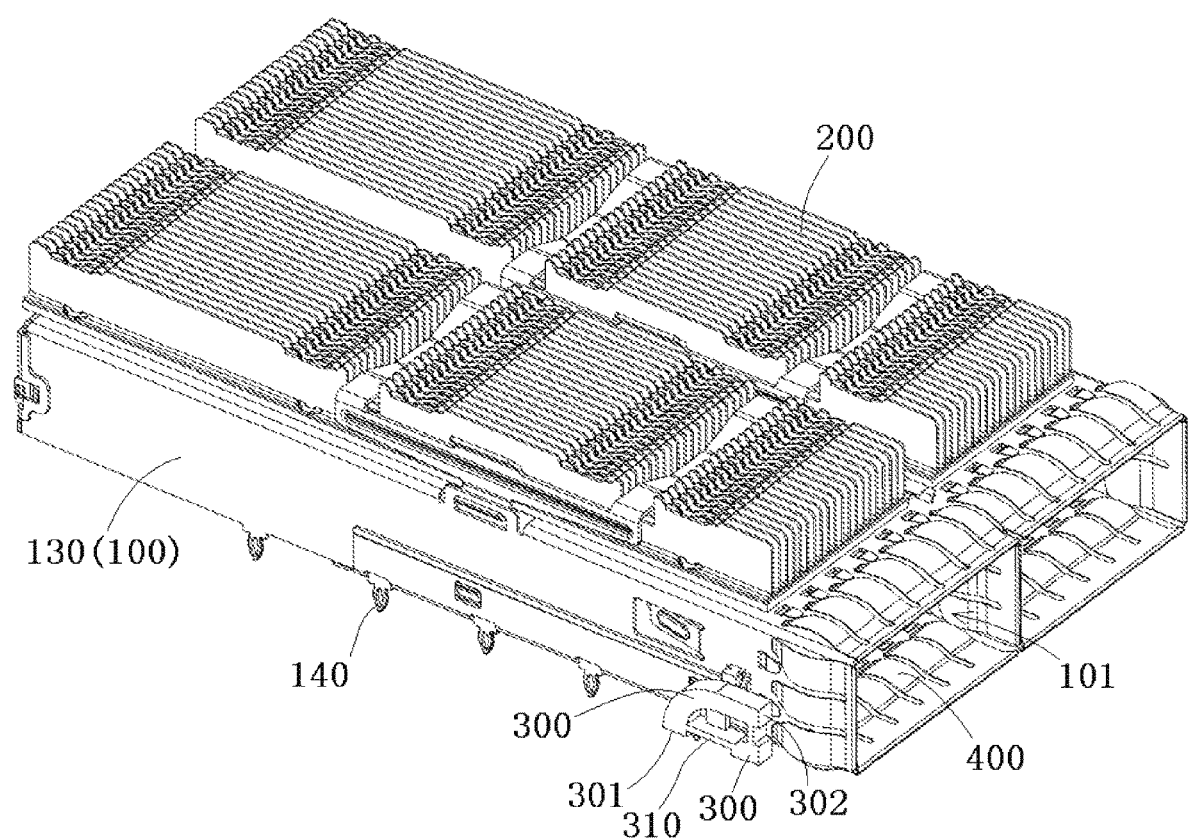
FIG. 1 is a perspective view of a connector according to an embodiment.

Embodiments of the present disclosure will be described hereinafter in detail with reference to the attached drawings, wherein like reference numerals refer to like elements. The present invention may, however, be embodied in many different forms and should not be construed as being limited to the embodiment set forth herein; rather, these embodiments are provided so that the present disclosure will convey the concept of the invention to those skilled in the art.

Figure 2:
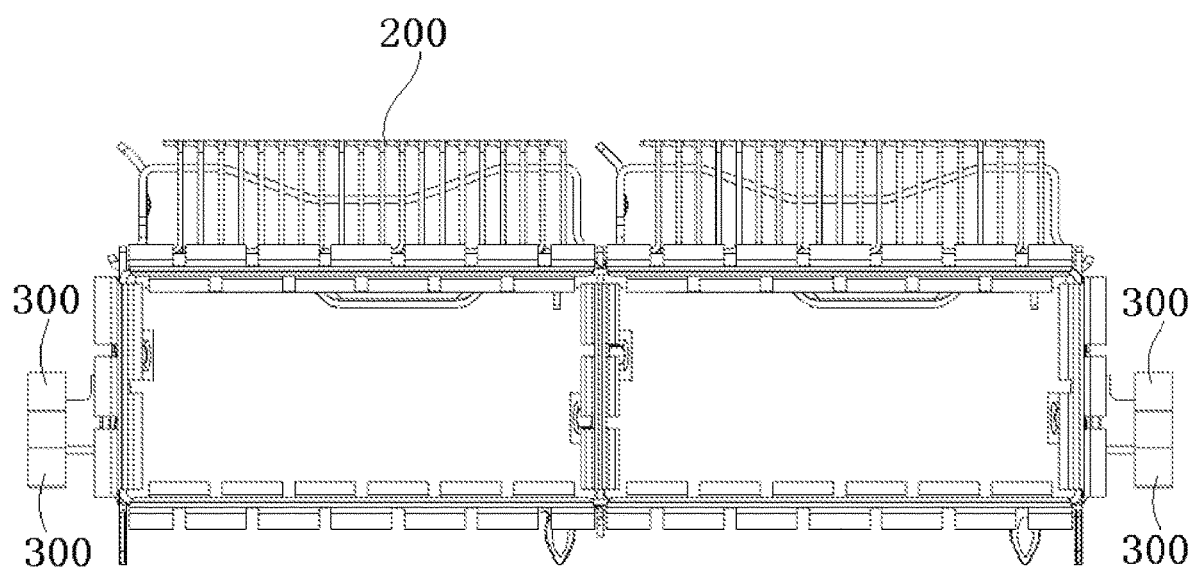
FIG. 2 is a front view of the connector of FIG. 1.

A connector, shown in FIGS. 1-2, comprises a cage 100. The cage 100 has a top wall, a bottom wall and a pair of side walls 130 between the top wall and the bottom wall.

Figure 3:
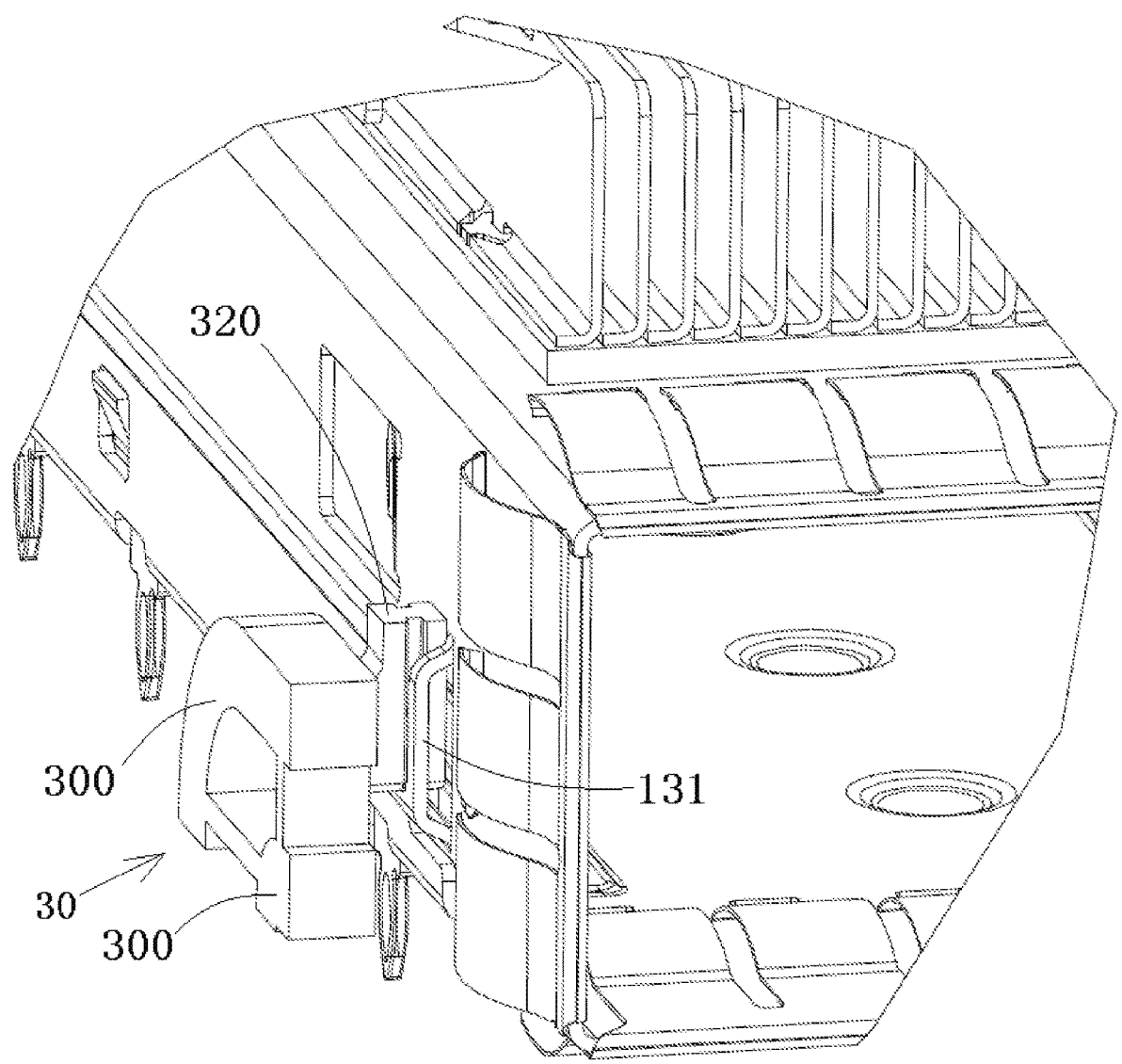
FIG. 3 is an enlarged view of the connector of FIG. 1.
Figure 4:
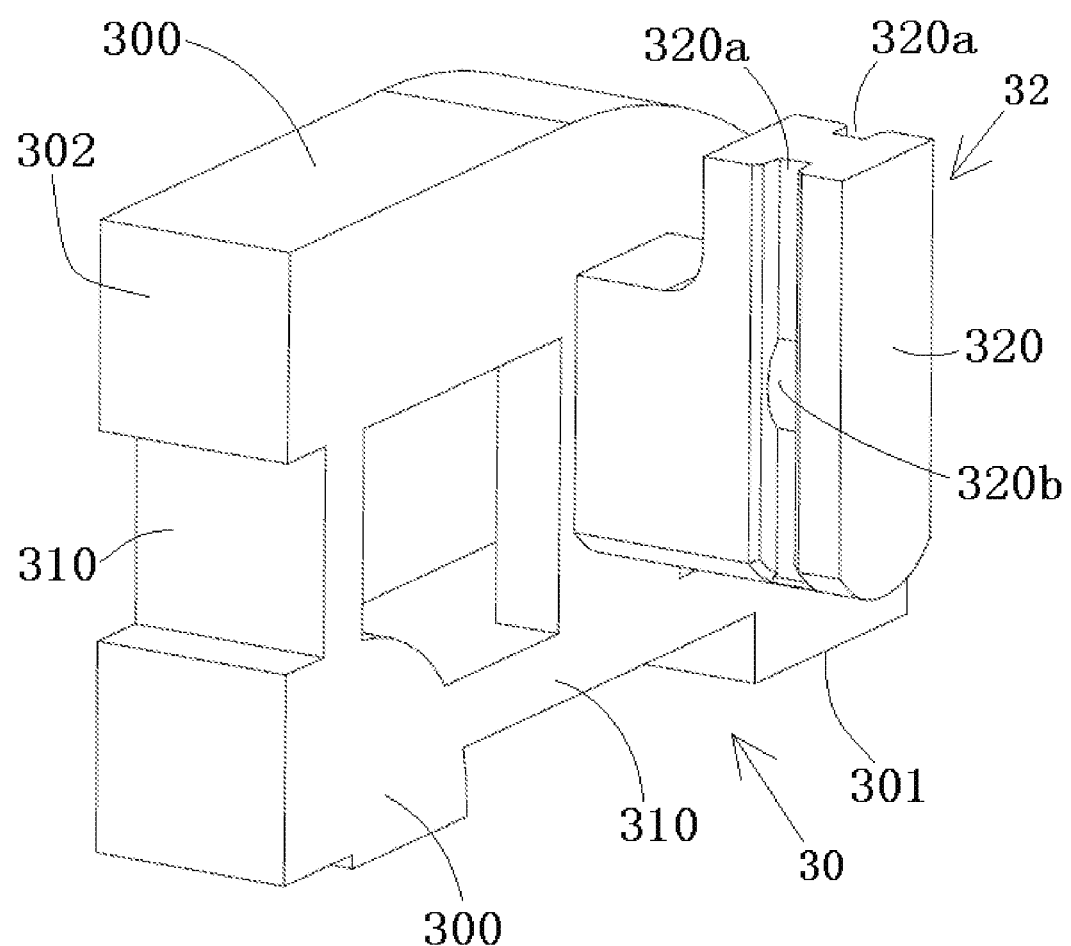
FIG. 4 is a perspective view of the light pipe assembly of the connector of FIG. 3.

The connector further comprises a light pipe assembly 30 comprising at least one light pipe 300 and a first connection structure 32, as shown in FIGS. 3-4. The first connection structure 32 is configured to fix the light pipe assembly 30 on an outer surface of one of the side walls 130 of the cage 100.

In an embodiment shown in FIGS. 1-2, the connector further comprises a radiator 200 adapted to be mounted on the top wall of the cage 100.

The first connection structure 32, as shown in FIGS. 3-4, is configured to be a sliding pluggable connection structure. The sliding pluggable connection structure is adapted to fix the light pipe assembly 30 to the outer surface of the side wall 130 of the cage 100 by an insertion connection in a vertical direction perpendicular to the bottom wall of the cage 100.

Figure 5:
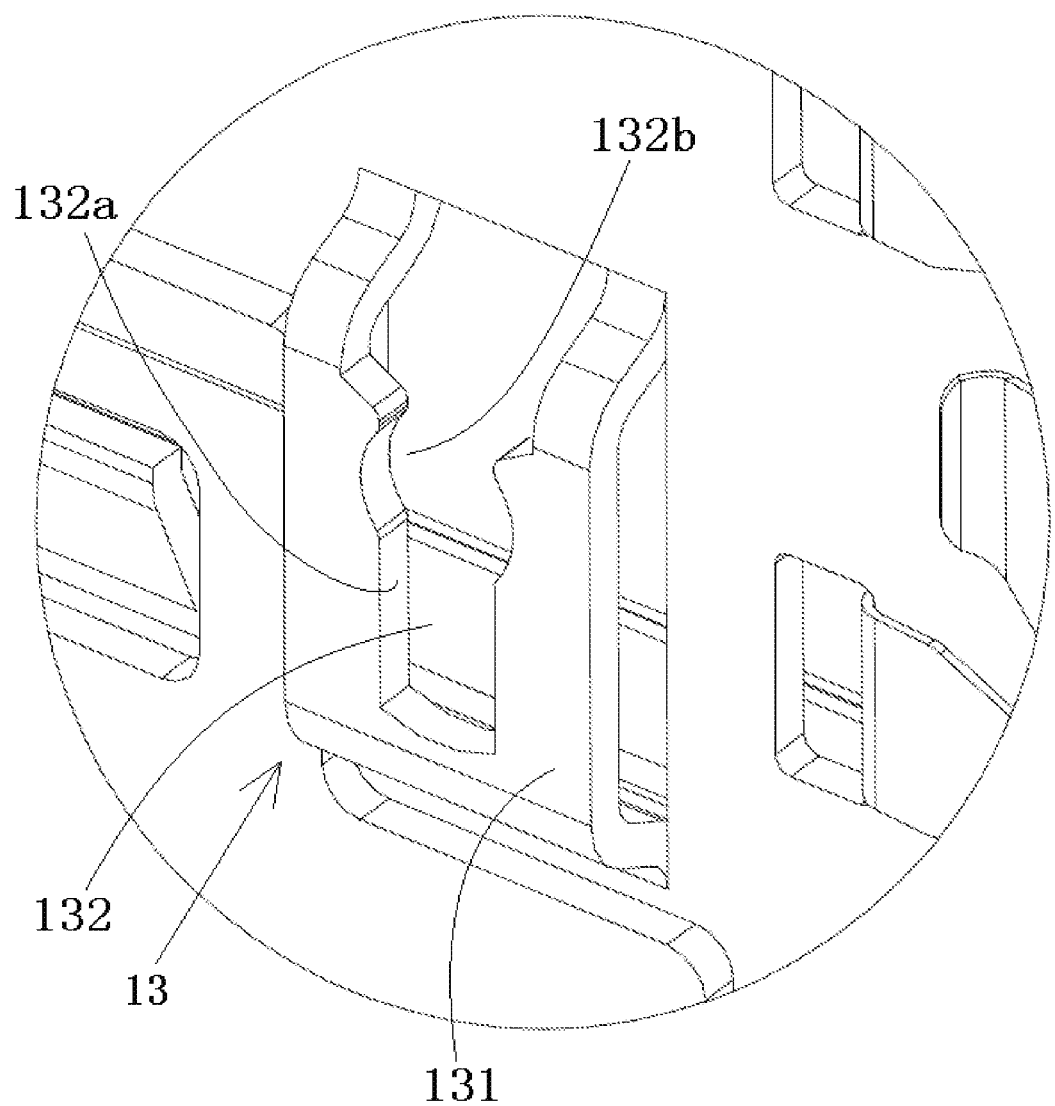
FIG. 5 is an enlarged view of a second connection structure of the connector of FIG. 3.

FIG. 5 is an enlarged view of a second connection structure 13 on the side wall 130 of the connector of FIG. 3.

As shown in FIGS. 3-5, a second connection structure 13 adapted to be mated with the first connection structure 32 is formed on the side wall 130 of the cage 100. The light pipe assembly 30 is adapted to be mounted and fixed on the outer surface of a side wall 130 of the cage 100 by the first connection structure 32 and the second connection structure 13.

The light pipe assembly 30 comprises a plurality of light pipes 300, as shown in FIGS. 3-5. The plurality of light pipes 300 are arranged along a vertical direction in a vertical plane in sequence and separated from each other. Two adjacent light pipes 300 of the light pipe assembly 30 are connected to each other.

Each light pipe assembly 30 comprises two light pipes 300, as shown in FIGS. 3-5. But the present disclosure is not limited to this, each light pipe assembly 30 may comprise one, three or more light pipes.

The first connection structure 32 of the light pipe assembly 30 comprises a sliding block 320, as shown in FIGS. 3-5. The sliding block 320 is provided on one side of the plurality of light pipes 300 and adapted to be inserted into the second connection structure 13 on the side wall 130 of the cage 100.

As shown in FIGS. 3-5, the second connection structure 13 of the cage 100 comprises a protruding platform 131 formed on the outer surface of the side wall 130 of the cage 100. A U-shaped slot 132 is formed in the protruding platform 131. The sliding block 320 of the light pipe assembly 30 is adapted to be inserted into the U-shaped slot 132, so as to fix the light pipe assembly 30 to the side wall 130 of the cage 100.

A groove 320a, as shown in FIGS. 3-5, is formed on each side of the sliding block 320. Two side edges 132a of the U-shaped slot 132 are adapted to be inserted into the grooves 320a on both sides of the sliding block 320, respectively.

The two side edges 132a of the U-shaped slot 132 are inserted into the grooves 320a of the sliding block 320 when the sliding block 320 is inserted into the U-shaped slot 132, so as to connect the sliding block 320 and the protruding platform 131 together, as shown in FIGS. 3-5.

As shown in FIGS. 3-5, a protrusion 320b is formed on one of a bottom surface of the groove 320a and the side edge 132a of the U-shaped slot 132, and a recession 132b engaged with the protrusion 320b is formed on the other of the bottom surface of the groove 320a and the side edge 132a of the U-shaped slot 132.

The protrusion 320b and the recession 132b are engaged to each other when the side edge 320a of the sliding block 320 is inserted into the side edge 132a of the U-shaped slot 132, so as to lock the sliding block 320 on the protruding platform 131, as shown in FIGS. 3-5. In this way, it may prevent the sliding block 320 from being accidentally slid out of the U-shaped slot 132 of the protruding platform 131.

The sliding block 320 and the U-shaped slot 132 extend in a vertical direction (a thickness direction of the connector). The U-shaped slot 132 is opened upward, so that the sliding block 320 may be conveniently inserted into the U-shaped slot 132 in the vertical direction, as shown in FIGS. 3-5.

Please note that the connection structure between the light pipe assembly 30 and the cage 100 is not limited to the above illustrated embodiments. For example, the sliding block 320 may be formed on the side wall 130 of the cage 100, and the U-shaped slot 132 may be formed on the light pipe assembly 30. The sliding block 320 is adapted to be inserted into the U-shaped slot 132, so as to fix the light pipe assembly 30 to the side wall 130 of the cage 100.

The protruding platform 131 may be configured to be a protruding structure formed by punching the side wall 130 of the cage 100, as shown in FIGS. 3-5.

As shown in FIGS. 3-5 any two adjacent light pipes 300 of the light pipe assembly 30 are connected by at least one connection piece 310.

The plurality of light pipes 300, the sliding block 320, and the connection pieces 310 of the light pipe assembly 30 are configured to be a single integrated member molded with transparent material, as shown in FIGS. 3-5. That is, the whole light pipe assembly 30 is configured to be a single integrated member molded with transparent material. In this way, it may save the cost.

As shown in FIGS. 1 and 4, each light pipe 300 has a light input surface 301 facing a circuit board (not shown) at the bottom of the cage 100 and a light output surface 302 facing a user in front of the cage 100, so as to transmit a light from an indicator mounted on the circuit board to the user's eyes.

The plurality of light pipes 300 of the light pipe assembly 30 has different light guide paths, as shown in FIGS. 1 and 4. The light guide path of the upper one of two adjacent light pipes 300 of the light pipe assembly 30 has a bending radius larger than that of the light guide path of the lower one of the two adjacent light pipes 300. The uppermost light pipe 300 has the longest light guide path and the largest bending radius, as shown in FIGS. 1 and 4. The lowermost light pipe 300 has the shortest light guide path and the smallest bending radius.

The plurality of light pipes 300 of the light pipe assembly 30 may be designed to have consistent light conduction intensity, for example, by optimizing the turning size and the turning angle of each light pipe 300, as shown in FIGS. 1 and 4.

A size of the plurality of light pipes 300 of the light pipe assembly 30 in a length direction of the cage 100 is far less than the length of the cage 100, as shown in FIG. 1. In an embodiment of the invention, the size of the plurality of light pipes 300 of the light pipe assembly 30 in a length direction of the cage 100 is configured to be 0.1~0.3 times the length of the cage 100.

The plurality of light pipes 300 of the light pipe assembly 30 are mounted on the outer surface of the side wall 130 near a front port of an insertion chamber 101 of the cage 100, as shown in FIG. 1.

An elastic shielding member 400 is mounted on four walls of the front port of the insertion chamber 101. The plurality of light pipes 300 of the light pipe assembly 30 are adjacent to the elastic shielding member 400 and located behind the elastic shielding member 400, as shown in FIG. 1.

A plurality of pins 140 are formed on the bottom of the cage 100. The plurality of pins 140 are adapted to be inserted into holes formed in a circuit board, so as to fix the cage 100 on the circuit board, as shown in FIG. 1.

As shown in FIGS. 1-5, the connector comprises a cage 100 having a top wall, a bottom wall and a pair of side walls 130 between the top wall and the bottom wall. A connection structure 13 is formed on an outer surface of the side wall 130 of the cage 100, and the connection structure 13 is adapted to fix a light pipe assembly 30 comprising at least one light pipe 300 to an outer surface of the side wall 130 of the cage 100 by an insertion connection in a vertical direction perpendicular to the bottom wall of the cage 100.

It should be appreciated by those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:
1. A connector, comprising:
  a cage having a top wall, a bottom wall and a pair of side walls between the top wall and the bottom wall; and
  a light pipe assembly having a light pipe and a first connection structure configured to fix the light pipe assembly on an outer surface of one of the side walls of the cage, the first connection structure comprising a sliding pluggable connection structure that fixes the light pipe assembly to the outer surface of the side wall of the cage by an insertion connection in a vertical direction perpendicular to the bottom wall of the cage.

2. The connector according to claim 1, further comprising a radiator mounted on the top wall of the cage.

3. The connector according to claim 1:
   (a) further including a second connection structure on the side wall of the cage and mated with the first connection structure, and
   (b) the light pipe assembly is mounted and fixed on the outer surface of a side wall of the cage by the first connection structure and the second connection structure.

4. The connector according to claim 3, wherein: the light pipe assembly includes a plurality of light pipes arranged in a vertical direction in a vertical plane in sequence and are separated from each other and two of the light pipes, which are adjacent, are connected to each other.

5. The connector according to claim 4, wherein: the first connection structure includes a sliding block on one side of the plurality of light pipes and is inserted into the second connection structure on the side wall of the cage.

6. The connector according to claim 4, wherein each one of the light pipes has a light input surface facing a circuit board at the bottom wall of the cage and a light output surface facing a user in front of the cage, so as to transmit a light from an indicator mounted on the circuit board to the user's eyes.

7. The connector according to claim 6, wherein the plurality of light pipes on each of the side walls of the cage has different light guide paths and the plurality of light pipes on each of the side walls of the cage has a consistent light conduction intensity.

8. The connector according to claim 4, wherein a size of the plurality of light pipes in a length direction of the cage is 0.1~0.3 times the length of the cage.

9. The connector according to claim 8, wherein the plurality of light pipes are mounted on the outer surface of the side wall of the cage near a front port of an insertion chamber.

10. The connector according to claim 9, further including an elastic shielding member mounted on the top wall of the cage, the bottom wall and the pair of side walls of the front port of the insertion chamber, and the plurality of light pipes are adjacent to the elastic shielding member and located behind the elastic shielding member.

11. The connector according to claim 1, further including a plurality of pins on the bottom wall of the cage adapted to be inserted into a plurality of holes in a circuit board, so as to fix the cage on the circuit board.

12. A connector, comprising:
   a cage having a top wall, a bottom wall and a pair of side walls between the top wall and the bottom wall;
   a light pipe assembly having a light pipe and a first connection structure configured to fix the light pipe assembly on an outer surface of one of the side walls of the cage, the first connection structure including a sliding block on one side of the light pipe and is inserted into a second connection structure on the side wall of the cage, wherein:
   (a) the second connection structure includes a protruding platform on the outer surface of the side wall of the cage and has a U-shaped slot formed therein, and
   (b) the sliding block is inserted into the U-shaped slot to fix the light pipe assembly to the sidewall of the cage.

13. The connector according to claim 12, wherein: the first connection structure is a sliding pluggable connection structure, that fixes the light pipe assembly to the outer surface of the side wall of the cage by an insertion connection in a vertical direction perpendicular to the bottom wall of the cage.

14. The connector according to claim 12, wherein:
   (a) each side of the sliding block has a groove and a plurality of side edges of the U-shaped slot are adapted to be inserted into the groove on each side of the sliding block, and
   (b) the plurality of side edges of the U-shaped slot are inserted into the grooves of the sliding block when the sliding block is inserted into the U-shaped slot to connect the sliding block and the protruding platform.

15. The connector according to claim 14, wherein:
   a bottom surface of the groove in the sliding block has a protrusion, a side edge the U-shaped slot has a recession, and the protrusion and the recession are engaged when the sliding block is inserted into the U-shaped slot to lock the sliding block on the protruding platform.

16. The connector according to claim 15, wherein the protruding platform is formed by punching the side wall of the cage.

17. The connector according to claim 15, wherein the light pipe assembly includes a plurality of light pipes arranged in a vertical direction in a vertical plane in sequence and are separated from each other, and any two of the light pipes, which are adjacent, are connected by a connection piece.

18. The connector according to claim 17, wherein the plurality of light pipes, the sliding block and the connection piece of the light pipe assembly are a single integrated member molded with transparent material.

19. A connector comprising:
   a cage having a top wall, a bottom wall, and a pair of side walls between the top wall and the bottom wall;
   a first connection structure formed on an outer surface of the side wall of the cage, the first connection structure comprising a sliding pluggable connection structure that fixes the outer surface of the side wall of the cage to the light pipe assembly by an insertion connection in a vertical direction perpendicular to the bottom wall of the cage; and
   a light pipe assembly including a light pipe fixed to the connection structure of the cage by the insertion connection in a vertical direction perpendicular to the bottom wall of the cage.

20. The connector according to claim 19, wherein the first connection structure includes a sliding block on the outer surface of the side wall of the cage, and wherein the light pipe assembly further includes a second connection structure comprising a protruding platform on a side of the light pipe assembly having a U-shaped slot formed therein for receiving the sliding block to fix the light pipe assembly to the side wall of the cage.

* * * * *